United States Patent [19]
Drexler et al.

[11] Patent Number: 4,518,830
[45] Date of Patent: May 21, 1985

[54] ARMORED TELEPHONE CORD WITH A LONGITUDINAL STRENGTH MEMBER

[75] Inventors: Leonard H. Drexler, Carmel; Richard M. Flynn, Indianapolis, both of Ind.; George R. Fox, Holmdel; Herbert C. Illium, Jr., Ocean, both of N.J.; Robert J. O'Connor, Greenfield, Ind.

[73] Assignee: AT&T Bell Laboratories, Murray Hill, N.J.

[21] Appl. No.: 392,002

[22] Filed: Jun. 25, 1982

[51] Int. Cl.³ .................. H04M 1/15; H04M 1/03; H04R 1/06
[52] U.S. Cl. ................... 179/103; 174/109; 179/100 R; 179/178; 179/186; 339/104
[58] Field of Search ............ 174/102 R, 109, 69 R, 174/70 R; 179/100 R, 103, 178, 183, 184, 186; 339/28, 103 C, 104, 278 T

[56] References Cited

U.S. PATENT DOCUMENTS

| | | | |
|---|---|---|---|
| 896,700 | 8/1908 | Atwood | 339/104 |
| 2,220,393 | 11/1940 | Bylander | 174/70 R |
| 2,795,641 | 6/1957 | Rowell | 179/186 |
| 3,235,674 | 2/1966 | Mirstam | 179/103 |
| 3,290,429 | 12/1966 | Prescott et al. | 174/102 R |
| 3,291,898 | 12/1966 | Sandell | 174/109 |
| 3,377,442 | 4/1968 | Foster, Jr. | 179/186 |
| 3,674,915 | 7/1972 | Pritchard | 174/102 R |
| 3,929,164 | 12/1975 | Richter | 138/120 |
| 4,079,190 | 3/1978 | Jones et al. | 174/102 R |
| 4,087,659 | 5/1978 | Boenecke | 179/103 |
| 4,130,740 | 12/1978 | Cogan | 179/103 |
| 4,259,544 | 3/1981 | Litauer | 174/102 R |

FOREIGN PATENT DOCUMENTS

| | | | |
|---|---|---|---|
| 901602 | 11/1944 | France | 174/109 |
| 608909 | 1/1979 | Switzerland | 174/69 |
| 974487 | 11/1961 | United Kingdom | 179/103 |

Primary Examiner—Gene Z. Rubinson
Assistant Examiner—Randall P. Myers
Attorney, Agent, or Firm—Samuel R. Williamson

[57] ABSTRACT

An armored cord has flexibility and tensile strength for securing a telephone handset to a telephone housing. The cord includes an outer armored sheath which is designed for increased flexibility in that it allows the cord to bend readily over small radii. Tensile strength between the handset and housing is provided by an internal cable which absorbs the stress applied to the cord when subjected to unusually large longitudinal forces. The service life of the cord is lengthened, and the number of incidents causing out-of-service conditions is thereby reduced.

16 Claims, 13 Drawing Figures

ARMORED TELEPHONE CORD WITH A LONGITUDINAL STRENGTH MEMBER

BACKGROUND OF THE INVENTION

1. Technical Field

This invention relates to armored electric cords and particularly to telephone armored cords that connect telephone handsets to housings of public telephones.

2. Description of the Prior Art

Many public telephones are located in unattended and isolated areas so as to provide reasonable and continuous access for the general public to the telephone system. Vandalism of these public telephones is a problem, however, with the handset and cord being the most vulnerable. Out-of-service conditions may result from damage sustained by the cord due to pulling and stretching of the outer protective covering when subjected to an unusually large force.

Handset cords in public telephones have traditionally been protected by armoring the cord with helically wound metal having adjacent interlocking helices, similar to "BX" or "Greenfield" armor. Unfortunately, these cords when made very strong are also very stiff. Thus, they tend to pull on the hand of the customer holding the handset, thereby adding substantially to its apparent weight.

In an effort to overcome the stiffness problem, an arrangement disclosed in U.S. Pat. No. 3,290,429, issued to R. E. Prescott et al. on Dec. 6, 1966, shows a flexible armored cord for connecting a telephone handset to a telephone housing. The cord comprises a number of separate sleeve-like armored elements forming an armored electric line for a central conductor by surrounding the conductor at longitudinal distributed points. Elements in the cord having inwardly flanged sleeves interlink with smaller diameter elements having outwardly flanged sleeves that extend between the larger inwardly flanged sleeves. This arrangement thus allows the cord to drape loosely and turn about comparatively small radii.

While the Prescott et al. arrangement enhances flexibility, it is nevertheless desirable to provide a simple and inexpensive armored cord which not only secures the handset to the housing with the desired flexibility but also with an increased longitudinal tensile strength to avoid damage that might result in an out-of-service condition.

SUMMARY OF THE INVENTION

In accordance with the invention, there is provided an armored cord having flexibility and strength for securing a telephone handset to a telephone housing. The cord includes an outer armored sheath which is designed for increased flexibility in that it allows the cord to bend readily over small radii. The outer sheath is also designed to be highly resistant to penetration or cutting by sharp objects. The strength necessary to overcome any strain likely to be caused by an unusually large longitudinal force is provided solely by an internal cable which secures the handset to the housing. With these features of construction, a telephone handset cord containing electrical conductors is provided with sufficient flexibility and longitudinal strength to reduce the likelihood of the forcible disconnection or removal of the handset. The service life of the telephone cord is lengthened and the number of incidents causing out-of-service conditions is thereby reduced.

BRIEF DESCRIPTION OF THE DRAWING

The invention and its mode of operation will be more clearly understood from the following detailed description when read with the appended drawings in which.

Throughout the drawing, the same elements when shown in more than one figure are designated by the same reference numerals.

DETAILED DESCRIPTION

Figure 1:
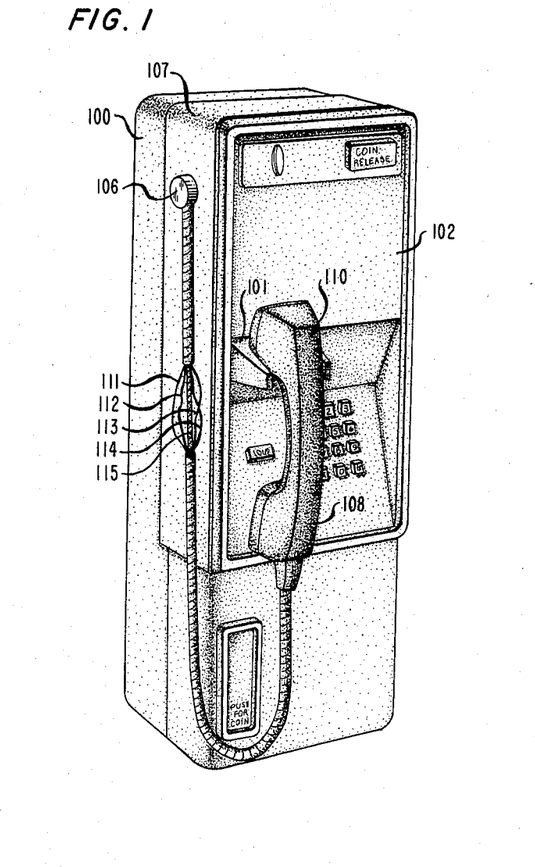
FIG. 1 is a perspective view of a public telephone showing a cord connecting a handset to a housing according to the invention.

Referring to FIG. 1 of the drawing, a housing 100 for a public telephone supports a switchhook 101 which is located on a front panel 102 of the housing. The housing 100 receives a handset cord 105 that extends from a mounting member 106 located on a sidewall 107 of the telephone housing to the lower transmitter end 108 of a handset 110.

The structure of the handset cord 105 is sufficiently limp so that the cord is able to bend readily over small radii. This is achieved by using an armored outer sheath designed for maximum flexibility. The sheath is wrapped using an unpacked fully interlocking construction which makes it extremely difficult to break the cord open by twisting. The outer surface of the cord is also resistant to penetration by objects such as pins or knife blades. Flexibility is further improved by having the sheath unpacked, i.e., the interlocking sections are not packed with a material to make the cord waterproof or airtight.

Figure 2:
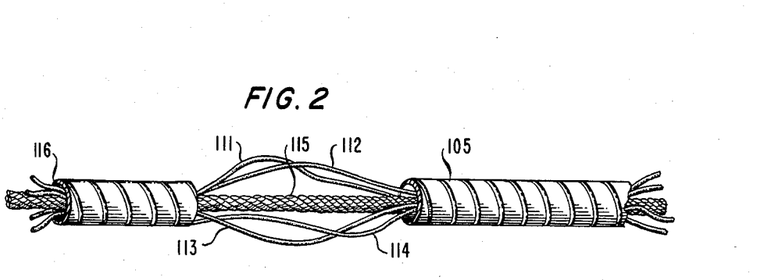
FIG. 2 is a detailed partially broken away view of a portion of a handset cord depicted in FIG. 1 and FIG. 8.

As seen in FIG. 1, where the outer sheath of the handset cord 105 is broken for purposes of illustration, and in greater detail in FIG. 2, the cord 105 comprises a plurality of insulated interior conductors 111 through 114 for carrying electrical signals between the housing 100 and the handset 110. The cord 105 also comprises a longitudinal strength member 115 that extends between the housing 100 and the handset 110 inside the armored outer sheath 116. Although the strength member 115 is illustrated to be collectively a single element in FIGS. 1 and 2, it actually comprises a plurality of twisted wires which could, for example, be made from stainless steel or some other strong material. In the embodiment shown, the strength member has a 3/32nd inch diameter and has 7×19 twisted strands, i.e., seven twisted strands each having 19 smaller wires so that the total number of individual stranded wires is 7×19. In this combination, the wires provide a very flexible arrangement while maintaining a very high tensile strength that is desirable for the handset cord 105. And the breaking strength for this strength member 115 is in excess of 800 pounds. Thus the combination of the strength member 115 when combined with the armored outer sheath 116 as the cover for the handset cord, provides both strength and flexibility in connecting the handset 110 to the telephone housing 100.

Figure 3:
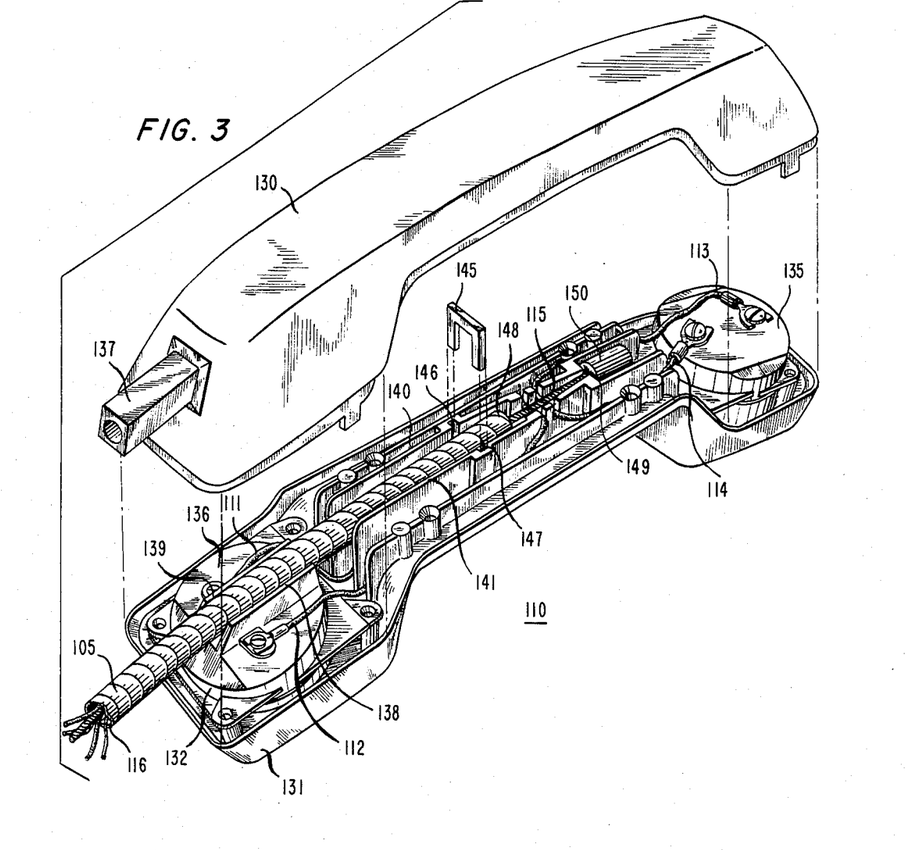
FIG. 3 is an exploded perspective view of the handset of FIG. 1 and of mounting members used for securing the handset cord.
Figure 4:
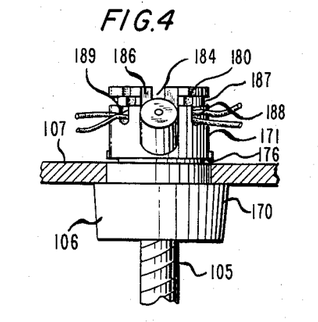
FIGS. 4 through 7 are detailed views of a mounting member and related components used for securing the handset cord in the housing of FIG. 1.
Figure 5:
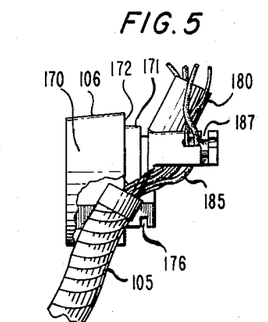
Figure 6:
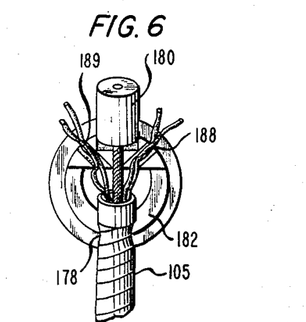
Figure 7:
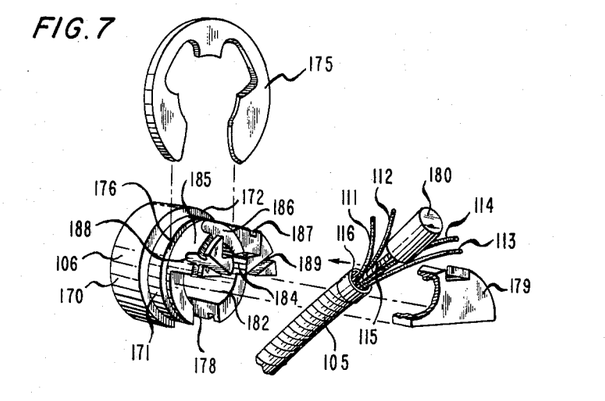

Referring now to FIG. 3, there is shown the outer sheath 116 and the strength member 115 suitably secured in the handset 110 which comprises a top portion 130 and a bottom portion 131. Also shown are the insulated conductors 111 and 112 which carry electrical signals from the telephone housing 100 to a transmitter housing 132 in the handset 110, and insulated conductors 113 and 114 which carry electrical signals from the housing 100 to a receiver housing 135 also in the handset 110. The outer sheath 116 enters the handset 110 through a rubber grommet 137 and is guided between upstanding walls 138 and 139 attached to the top surface 136 of the transmitter housing 132. The outer sheath 116 is also guided between upstanding walls 140 and 141 into a nested position where it is secured in the handset 110 by a generally U-shaped member 145. A section of the outer sheath 116 is crimped so that the U-shaped member 145 slides around this section and also slides into a pair of inwardly facing opposed grooves 146 and 147 in the spaced upstanding walls 140 and 141, respectively.

The upstanding walls 140 and 141 converge beyond the end section 148 of the sheath to a restricted opening 149 having a width corresponding to the diameter of the strength member 115. At the point of the restricted opening, these walls extend outward to provide a stop surface for a swaged end termination 150 which is affixed to the end of the strength member 115. A catch surface is provided by the larger diameter of the swaged end termination forming a shoulder at the common attachment point of the end termination and the strength member 115. The interaction between this stop surface and the catch surface on the swaged end termination 150 is the sole means for providing longitudinal tensile strength in the securing of the telephone cord 105 to the handset 110. When the top portion of the handset 130 is combined with the bottom portion of the handset 131, the top portion covers the upstanding wall pairs 138 and 139, and 140 and 141, thereby retaining the sheath in the channel as well as defining a cavity for retaining the swaged termination 150.

With reference to FIGS. 4 through 7, there is shown the details of the mounting member 106 and the termination arrangement for the handset cord 105 in the telephone housing 100. The mounting member 106 comprises a cylinder having a first portion 170 with a first diameter and a second portion 171 with a second smaller diameter sized for inserting in a mating circular opening in the sidewall 107 of the telephone housing 100. Angular rotation of the cylinder in the sidewall of the housing is made possible through use of the mating circular opening.

The cylinder is secured to the sidewall 107 of the housing 100 by the combination of (1) a shoulder 172 formed by the difference in the diameter between the first portion 170 and the second portion 171 of the cylinder and (2) a retaining member 175 inserted in the cylindrical groove 176 on that part of the second portion of the cylinder extending inside the sidewall 107 of the housing 100. The first portion of the cylinder also includes a radial slot 178 that is adapted for receiving a crimped portion of the outer sheath 116. The crimped portion of the sheath is buttressed in this slot and secured by the adjacent outer sidewall 107 of the telephone housing 100.

As in the telephone handset, the strength member end termination in the telephone housing 100 is that of a swaged termination 180 with a larger diameter than that of the strength member 115. Also a catch surface is provided by the larger diameter of the end termination which forms a shoulder at the common attachment point of the end termination and the flexible strength member 115. The strength member 115 extends from an interior chamber 182 of the cylinder through a notched opening 184 on the second portion of the cylinder and onto a stop surface 186 formed by a hollow in the outer surface 185 of the second portion of the cylinder. The interaction between the stop surface 186 on the second cylinder portion 171 and the catch surface on the end termination 180 provides the sole means for longitudinal tensile strength in the securing of the handset cord 105 to the telephone housing 100. A second cylindrical groove 187 is also located on the second portion of the cylinder for mounting the retaining cover 179. This cover keeps the electrical conductors 111 through 114 in designated slots 188 and 189 formed in the second portion 171 of the cylinder.

Figure 8:
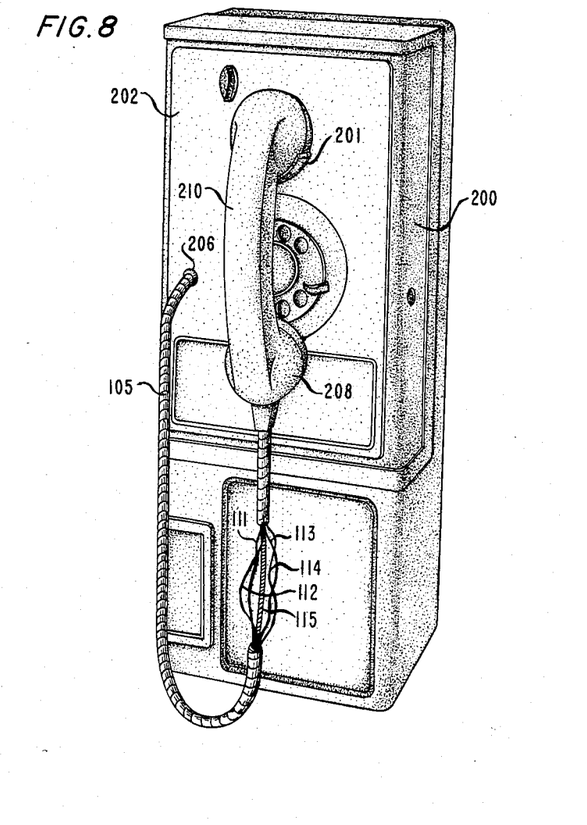
FIG. 8 is a perspective view of another public telephone showing the cord connecting a handset to a housing according to the invention.

FIG. 8 shows another embodiment for the public telephone housing with the handset cord 105 connecting a handset 210 to a telephone housing 200 in accordance with the invention. The housing 200 supports a switchhook 201 which is essentially located on a front panel 202 of the housing 200. The handset cord 105 extends from an opening 206 in the housing to the lower transmitter end 208 of the handset 210. The structure of the handset cord 105 is sufficiently limp for the cord to drape down and form a small loop before extending upwards.

As seen in FIG. 8 and in greater clarity in FIG. 2, the cord 105 comprises a plurality of insulated interior conductors 111 through 114 for carrying electrical signals between the housing 200 and the handset 210. The cord 105 also includes a strength member 115 that extends throughout the length of the cord and is secured both in the handset 210 and inside the housing behind the opening 206.

Figure 9:
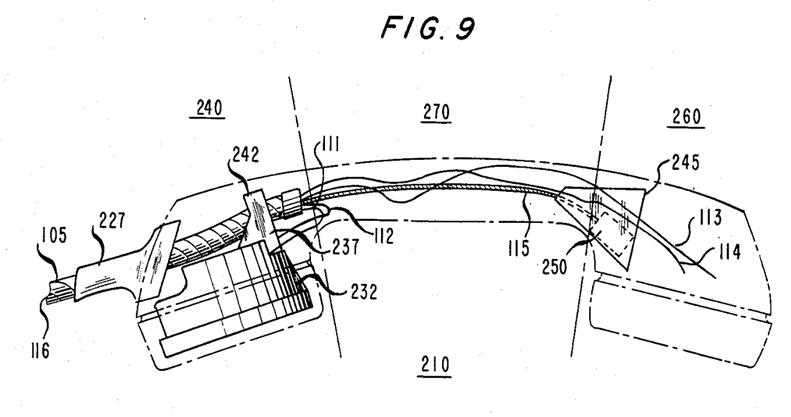
FIG. 9 is a view of the handset of FIG. 8, partially in section, illustrating the mounting members used for securing the handset cord.
Figure 10:
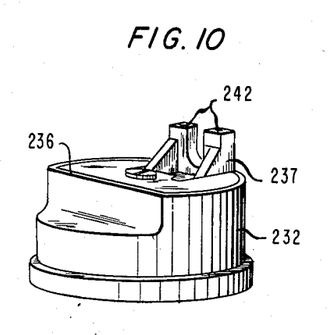
FIG. 10 is a perspective view of a transmitter housing arranged for securing an outer sheath of the handset cord.
Figure 11:
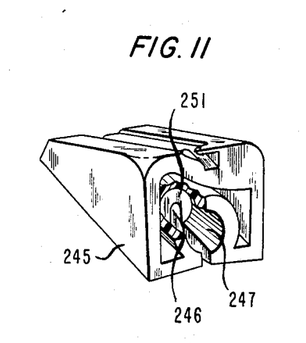
FIG. 11 is a perspective view of a wedge-shaped member located in the handset depicted in FIG. 8 and arranged for terminating a strength member in a handset cord.

FIGS. 9, 10, and 11 show in detail the termination arrangement of the outer sheath 116 and the strength member 115 in the handset 210. The handset cord 105, containing the sheath 116 and the strength member 115, enters the handset 210 via a grommet 227. For securing the sheath 116 in the handset 210, a transmitter housing 232 in a transmitter portion 240 has a surface 236 which includes an upstanding generally U-shaped member 237 situated thereupon. A crimped section of the outer sheath is depressed into the space defined by the legs of the U-shaped member 237 for securing the sheath thereto. A wall forming the back plane of the telephone handset 210 is located adjacent to the U-shaped member and extends transverse to the height of the U-shaped member across the top 242 of its upstanding legs. The sheath is thus securely positioned and retained between the legs of the U-shaped member 237 and the back plane of the handset 210.

FIGS. 9 and 11 also show how the strength member 115 is secured in the handset 210. A wedge-shaped member 245 generally located in the receiver portion 260 of the handset housing has its tapered section extending slightly into the yoke portion 270 of the telephone handset 210. The wedge-shaped member 245 also has axially aligned slots of a first and a second diameter extending throughout its length, the first slot 246 defining a passageway for the strength member 115 and the second larger slot 247 being suitably sized for receiving the end termination 250 of the strength member 115 and providing a stop surface 251 extending orthogonally from the first slot 246. The yoke portion 270 of the handset includes a chamber which provides a passageway for the strength member 115 and expands at the common point between the yoke portion 270 and the receiver portion 260. It is at this expansion point that the wedge-shaped member 245 is secured in the handset 210 by having its tapered edge project into the expanded chamber in the yoke portion 270 of the handset 210. The longitudinal tensile strength for securing the cord 105 to the handset 210 is obtained solely from the interaction between the stop surface 251 of the wedge-shaped member and the cylindrically shaped member 250.

Figure 12:
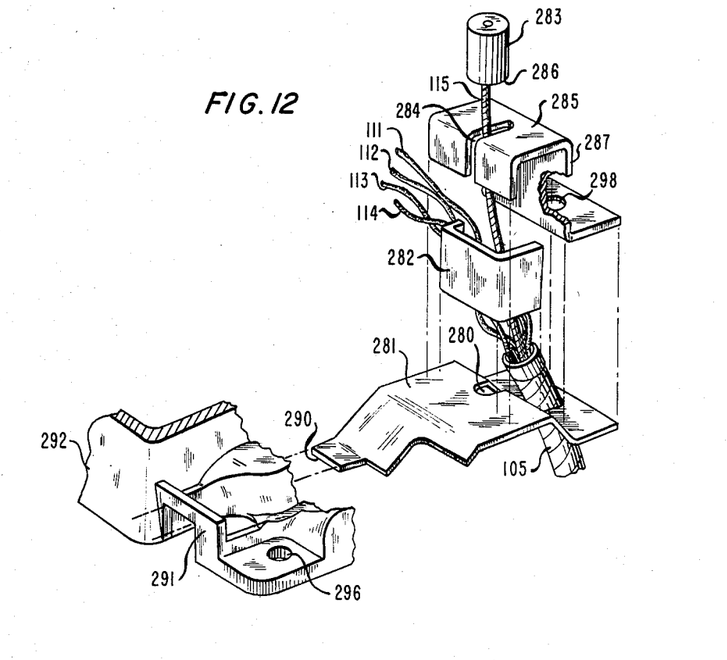
FIG. 12 is an exploded perspective view of some of the mounting members used for securing the handset cord in the housing of FIG. 8.
Figure 13:
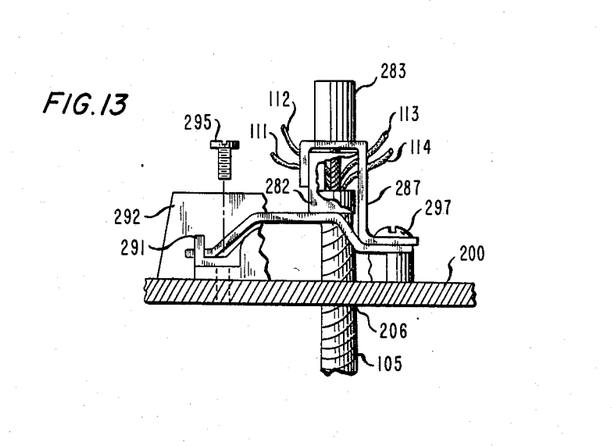
FIG. 13 is a fragmentary side elevation view, partially in section, illustrating the mounting member of FIG. 12.

FIGS. 12 and 13 show the handset cord securing arrangement that is provided inside the telephone housing 200 behind opening 206. After passing through opening 206, the outer sheath 116 passes through a slot 280 on mounting member 281. A crimped section of the sheath is engaged in this slot such that it is secured in a longitudinal direction. A U-shaped spacer member 282 allows clearance for the strength member 115 and the insulated conductors 111 through 114 to pass through. The strength member 115 with its swaged end termination 283 passes through a slot 284 on a securing member 285, with the upper surface of the securing member 285 providing a stop surface for the catch surface 286 of the swage termination 283. And a sidewall surface 287 of the securing member 285 keeps the crimped portion of the sheath depressed in the slot 280. The U-shaped spacer member 282 also retains the strength member 115 in the slot 284 on the upper surface of the member 285 when the arrangement is assembled. An extending tab 290 located on mounting member 281 extends outward for locating underneath a bridge-like frame 291 on a chassis 292 within the telephone housing 200. This chassis is affixed to the telephone housing 200 in this location by threaded fasteners 295 and 297. Threaded fastener 295 is inserted in the opening 296 and attached to the wall of the housing 200. Threaded fastener 297 is inserted in both the opening 298 on securing member 285 and a portion of the slot 280 on mounting member 281 before being attached to the wall of the housing 200.

Although only specific exemplary embodiments of this invention have been described in detail, those skilled in the art will appreciate that many variations and/or modifications may be made in the exemplary embodiments without in any way departing from the novel and advantageous features of this invention. Accordingly, all such variations and modifications are intended to be included within the scope of this invention as defined in the appended claims.

What is claimed is:

1. A cord for securing a telephone handset to a telephone housing, the cord comprising both a plurality of conductors and a flexible armored sheath having a longitudinal strength member disposed in its interior and extending throughout its length for providing tensile strength between the telephone handset and the telephone housing, the strength member being attached at one end inside the telephone handset and at the other end inside the telephone housing, the telephone handset comprising means for securing the sheath in the handset, and the securing means further comprising guiding means formed by a pair of spaced upstanding walls extending in generally parallel planes, the guiding means forming a channel for guiding the end section of the sheath into a nested position in the handset and restraining the sheath in a direction transverse to its length, and capture means comprising a generally U-shaped member and a pair of inwardly facing opposed grooves in the spaced upstanding walls for receiving the U-shaped member, the inner surface of the U-shaped member extending around a crimped portion of the sheath and restraining the sheath in the plane of the U-shaped member transverse to its height.

2. The cord as in claim 1 wherein the telephone handset includes means for securing the strength member in the handset, the strength member comprising a flexible cable having a first diameter with a cylindrically shaped end termination being axially aligned with the cable and having a second larger diameter, a catch surface being provided by the larger diameter of the end termination forming a shoulder at the common attachment point of the end termination and the flexible cable, and the strength member being longer in length and extending beyond the end section of the sheath in the pair of spaced upstanding walls, the upstanding walls converging beyond the end section of the sheath to a restricted opening having a width corresponding to the diameter of the cable and providing a stop surface extending generally orthogonal to the upstanding walls for engaging the catch surface of the cylindrically shaped end termination, the interaction between the stop surface and the catch surface being the sole means for providing longitudinal tensile strength in the securing of the cord to the handset.

3. The cord as in claim 1 wherein the telephone handset includes means for securing the strength member in the handset, the strength member comprising a flexible cable having a first diameter with a cylindrically shaped end termination being axially aligned with the cable and having a second larger diameter, a catch surface being provided by the larger diameter of the end termination forming a shoulder at the common attachment point of the end termination and the flexible cable, and the securing means comprising a pair of spaced upstanding walls in the handset, the upstanding walls converging to a restricted opening having a width corresponding to the diameter of the cable and providing a stop surface extending generally orthogonal to the spaced upstanding walls for engaging the catch surface of the cylindrically shaped end termination, the interaction between the stop surface and the catch surface being the sole means for providing longitudinal tensile strength in the securing of the cord to the handset.

4. The cord as in claim 3 wherein the telephone handset includes means for securing the sheath in the handset, the sheath being shorter in length than the strength member and extending a smaller distance into the handset, the securing means comprising guiding means formed by the pair of spaced upstanding walls extending in generally parallel planes adjacent to the sheath, the guiding means forming a channel for guiding the end section of the sheath into a nested position in the handset and restraining the sheath in a direction transverse to its length, capture means comprising a generally U-shaped member and a pair of inwardly facing opposed grooves in the spaced upstanding walls for receiving the U-shaped member, the inner surface of the U-shaped member extending around the sheath and restraining the sheath in the plane of the U-shaped member transverse to its height.

5. The cord as in claim 2 or 4 wherein the telephone handset includes a cover member detachably connected across the top of the upstanding walls for retaining the sheath in the channel and for defining a cavity for retaining the cylindrically shaped end termination.

6. The cord as in claim 5 wherein the telephone handset includes a transmitter portion, a receiver portion, and a yoke portion interposed between the transmitter portion and receiver portion, and the securing means for the sheath and the securing means for the strength member both being located in the yoke of the telephone handset.

7. The cord as in claim 1 wherein the telephone housing includes means for securing the sheath in the housing, the means comprising a cylinder having a first portion with a first diameter and a second portion with a second smaller diameter, the second portion sized for inserting in a mating circular opening in a sidewall of the telephone housing and having a cylindrical groove about its perimeter for insertion of a circular retaining member, the cylinder being secured to the sidewall of the housing by the combination of a shoulder formed by the difference in the diameter between the first portion and the second portion of the cylinder and the retaining member inserted in the cylindrical groove on that part of the second portion of the cylinder extending inside the housing, the first portion of the cylinder including a radial slot adapted for receiving the sheath, the end of the sheath extending through the slot and terminating in an interior chamber in the first cylinder portion, the sheath being buttressed in the slot and secured by the adjacent outer sidewall of the housing.

8. The cord as in claim 7 wherein the telephone housing includes means for securing the strength member in the housing, the strength member comprising a flexible cable having a first diameter with a cylindrically shaped end termination being axially aligned to the cable and having a second larger diameter, a catch surface being provided by the larger diameter of the end termination forming a shoulder at the common attachment point of the end termination and the flexible cable, and the strength member being longer in length than the sheath and extending from the interior chamber of the first portion of the cylinder through a notched opening on the second portion of the cylinder, the catch surface on the end termination engaging a stop surface formed by a hollow in the outer surface of the second portion of the cylinder, the interaction between the stop surface on the second portion of the cylinder and the catch surface on the end termination being the sole means for providing longitudinal tensile strength in the securing of the cord to the housing.

9. The cord as in claim 1 wherein the telephone housing includes means for securing the strength member in the housing, the means comprising a cylinder having a first portion with a first diameter and a second portion with a second smaller diameter, the second portion sized for inserting in a mating circular opening in a sidewall of the telephone housing and having a cylindrical groove about its perimeter for insertion of a circular retaining member, the cylinder being secured to the sidewall of the housing by the combination of a shoulder formed by the difference in the diameter between the first portion and the second portion of the cylinder and the retaining member inserted in the cylindrical groove on that part of the second portion of the cylinder extending inside the housing, and the strength member comprising a flexible cable having a first diameter with a cylindrically shaped end termination being axially aligned to the cable and having a second larger diameter, a catch surface being provided by the larger diameter of the end termination forming a shoulder at the common attachment point of the end termination and the flexible cable, and the strength member extending through a radial slot on the first portion of the cylinder into an interior chamber of the first portion of the cylinder and through a notched opening in the second portion of the cylinder to the outer surface of the second portion of the cylinder, the catch surface on the end termination engaging a stop surface formed by a hollow in the outer surface of the second portion of the cylinder, the interaction between the stop surface on the second portion of the cylinder and the catch surface on the end termination being the sole means for providing longitudinal tensile strength in the securing of the cord to the housing.

10. The handset cord as in claim 9 wherein the telephone housing comprises means for securing the sheath in the housing, the means including the radial slot in the first portion of the cylinder adapted for receiving the sheath, the sheath extending through the slot and having its end terminating in the interior chamber in the first portion of the cylinder, the sheath being buttressed in the slot and secured by the adjacent outer sidewall of the housing.

11. The cord as in claim 8 or 10 wherein the cylinder is adapted to pivot on its axis with respect to the sidewall of the telephone housing.

12. A telephone handset cord comprising a flexible armored sheath having disposed in its interior and extending throughout its length both a plurality of conductors and a strength member for providing tensile strength between a telephone handset and a telephone housing, the strength member being secured at one end inside the telephone handset and at the other end inside the telephone housing, and wherein the telephone handset comprises a transmitter portion, a receiver portion, and a tapered yoke portion interposed between the transmitter and the receiver portions, and means for securing the strength member in the handset, the strength member comprising a flexible cable having a first diameter with a cylindrically shaped end termination, the end termination being axially aligned with the cable and having a second larger diameter, a catch surface being provided by the larger diameter of the end termination forming a shoulder at the common attachment point of the end termination and the flexible cable, and the strength member being longer in length and extending beyond the end section of the sheath in the handset, the securing means further comprising a wedge-shaped member located in the receiver portion of the handset, the wedge-shaped member having axially aligned slots of a first and a second diameter, the first diameter slot defining a passageway for the cable and the second diameter slot receiving the end termination and providing a stop surface therefor, the yoke portion including a chamber which provides a passageway for the strength member and expands at the common point between the yoke portion and the receiver portion, the wedge-shaped member being secured in the handset by having its tapered edge project into the expanded chamber in the yoke portion of the handset, the interaction between the stop surface of the wedge-shaped member and the catch surface of the cylindrically shaped member providing the longitudinal tensile strength in the securing of the cord to the handset.

13. The cord as in claim 12 wherein the telephone handset comprises means for securing the sheath in the handset, the securing means further comprising a cylindrically shaped member having a front and rear surface, the front surface having a recess for housing a transmitter and the rear surface having an upstanding generally U-shaped member situated thereupon, a wall forming the back plane of the telephone handset and extending transverse to the height of the U-shaped member, the U-shaped member having its legs spaced to define space for positioning a crimped portion of the sheath therebetween and the back plane extending across the top of the legs of the U-shaped member, the U-shaped member and the back plane in combination restraining the sheath in the plane of the U-shaped member transverse to its height.

14. The handset cord as in claim 12 wherein the telephone housing comprises means for securing the sheath in the housing, the securing means further comprising a platform having a top surface and a pair of opposing sidewalls extending downward from the top surface, a first one of the sidewalls having a catch portion at its lower end extending generally parallel to the top surface for securing one end of the platform in the housing, and the second one of the sidewalls having a base connected to its lower edge for securing the other end of the platform in the housing, the base extending generally parallel to the top surface, the second sidewall and top surface in the base having a shared elongated notch for engaging a crimped portion of the sheath therein, the sheath being positioned in the notched part of the top surface and restrained in a longitudinal direction.

15. The handset cord as in claim 14 wherein the telephone housing includes means for securing the strength member in the housing, the means comprising an inverted U-shaped member with a substantially flat top surface and having a notch common to one of a pair of downward extending legs and the top surface of the U-shaped member, the other downward extending leg having at its bottom edge an extended surface extending generally parallel to the top surface of the U-shaped member, the extended surface being used for securing the U-shaped member to the telephone housing, and the strength member comprising a flexible cable having a first diameter with a cylindrically shaped end termination being axially aligned to the cable and having a second larger diameter, a catch surface being provided by the larger diameter of the end termination forming a shoulder at the common attachment point of the end termination and the flexible cable, the strength member extending through the notch on the inverted U-shaped member and the catch surface of the end termination engaging the top surface of the U-shaped member, the interaction between the catch surface on the end termination and the top surface of the U-shaped member being the sole means for providing longitudinal tensile strength in the securing of the cord to the housing.

16. The handset cord as in claim 15 wherein the means for securing the strength member in the housing further includes a retaining member for the strength member, the retaining member being interposed between the platform and the inverted U-shaped member and having a front wall and a pair of sidewalls, the notched downward extending leg of the inverted U-shaped member overlapping the front wall of the retaining member and securing the end termination on the top surface of the U-shaped member by restricting the passage of the strength member only through the notched top surface of the U-shaped member.

* * * * *